United States Patent
Yahia et al.

(10) Patent No.: US 12,194,813 B2
(45) Date of Patent: Jan. 14, 2025

(54) HEAT TREATMENT SYSTEM FOR A MOTOR VEHICLE

(71) Applicant: Valeo Systemes Thermiques, Le Mesnil Saint-Denis (FR)

(72) Inventors: Mohamed Yahia, Le Mesnil Saint-Denis (FR); Stefan Karl, Le Mesnil Saint-Denis (FR); Bertrand Nicolas, Le Mesnil Saint-Denis (FR)

(73) Assignee: VALEO SYSTEMES THERMIQUES, Le Mesnil-Saint-Denis (FR)

( * ) Notice: Subject to any disclaimer, the term of this patent is extended or adjusted under 35 U.S.C. 154(b) by 231 days.

(21) Appl. No.: 17/783,527

(22) PCT Filed: Dec. 2, 2020

(86) PCT No.: PCT/FR2020/052250
§ 371 (c)(1),
(2) Date: Jun. 8, 2022

(87) PCT Pub. No.: WO2021/116565
PCT Pub. Date: Jun. 17, 2021

(65) Prior Publication Data
US 2023/0031154 A1    Feb. 2, 2023

(30) Foreign Application Priority Data

Dec. 9, 2019   (FR) ...................................... 1913921

(51) Int. Cl.
*B60H 1/00*   (2006.01)
*B60L 58/24*   (2019.01)

(52) U.S. Cl.
CPC ..... *B60H 1/00899* (2013.01); *B60H 1/00278* (2013.01); *B60H 1/00385* (2013.01);
(Continued)

(58) Field of Classification Search
CPC ............ B60H 1/00278; B60H 1/00385; B60H 2001/00928; B60H 2001/00949; B60H 1/00392; B60H 1/32281; B60L 58/24
See application file for complete search history.

(56) References Cited

U.S. PATENT DOCUMENTS

2014/0124159 A1   5/2014   Kim
2016/0010534 A1   1/2016   Kawakami et al.

FOREIGN PATENT DOCUMENTS

| DE | 10226851 A1 | 1/2004 | |
|----|----|----|----|
| KR | 20170113948 A | 10/2017 | |
| WO | WO-2015003894 A1 * | 1/2015 | ......... B60H 1/00899 |

OTHER PUBLICATIONS

International Search Report and Written Opinion issued in corresponding International Patent Application No. PCT/FR2020/052250, mailed on Mar. 4, 2021 (11 pages).

* cited by examiner

*Primary Examiner* — Lionel Nouketcha
(74) *Attorney, Agent, or Firm* — Osha Bergman Watanabe & Burton LLP

(57) ABSTRACT

A temperature management system for a vehicle is disclosed. The temperature management system includes a refrigerant circuit and a heat transfer fluid loop. The refrigerant circuit includes a compression device, an expansion member, a first heat exchanger configured to exchange heat between the refrigerant and an air flow external to a vehicle interior, a second heat exchanger configured to exchange heat between the refrigerant and the heat transfer fluid circulating in the loop, and a fourth heat exchanger configured to exchange heat between the refrigerant and an air flow inside the vehicle interior. The heat transfer fluid loop includes, on a main line, the second heat exchanger and a primary radiator configured to exchange heat between the air (Continued)

flow external to the vehicle interior and the heat transfer fluid.

14 Claims, 11 Drawing Sheets

(52) U.S. Cl.
CPC .......... *B60H 1/00885* (2013.01); *B60L 58/24* (2019.02); *B60H 2001/00307* (2013.01); *B60H 2001/00928* (2013.01); *B60H 2001/00949* (2013.01)

HEAT TREATMENT SYSTEM FOR A MOTOR VEHICLE

The present invention relates to the field of heat transfer fluid loops operating with a refrigerant circuit. The subject of the invention is a temperature management system comprising at least a heat transfer fluid loop and a refrigerant circuit.

A refrigerant circuit is generally associated with a vehicle interior heating, ventilation and/or air-conditioning installation for managing the temperature of an air flow external to the vehicle and heading toward the vehicle interior. Specifically, through the changes in state of the refrigerant, such a circuit allows an air flow sent into the heating, ventilation and/or air-conditioning installation to be heated and/or cooled.

Such temperature management systems are generally integrated in vehicles with an electric powertrain, i.e. in which the powertrain comprises a motor operating at least partially on electrical energy supplied by one or more electrical storage devices on board the vehicle. As all of these elements are unable to withstand excessive temperature changes, the temperature management system ensures thermal regulation, more particularly cooling, of said elements.

These temperature management systems are most often at least partially arranged at the front end of the vehicles. More specifically, these temperature management systems conventionally comprise at least one heat exchanger which is arranged at this front end. When it comes to limiting the size of the equipment arranged at the front end, the reduction in the dimensions of such a heat exchanger is accompanied by a loss of efficiency of the temperature management systems and therefore of its capacity to cool the various electrical elements mentioned above.

In order to optimize the performance of the refrigerant circuit, it is known practice to incorporate at least one heat exchanger configured to allow the supercooling of the refrigerant by exchange of heat with the heat transfer fluid circulating in the heat transfer fluid loop. Conventional architectures of such a loop conventionally include a radiator arranged at the front end of the vehicle downstream of the heat exchanger according to the direction of the air flow through the heat exchanger.

However, it may be necessary to reverse such an architecture so that the radiator is arranged upstream of the heat exchanger according to the direction of circulation of the air flow external to the vehicle interior through this radiator and this heat exchanger. One drawback of such an architecture lies in the fact that the heat exchanger is unable to ensure supercooling of the refrigerant after its condensation phase, thus further reducing the performance of the temperature management system.

Such a loss of performance is particularly noticeable when the electrical storage device of the vehicle is used in such a way as to cause it to significantly heat up, for example during a phase of rapid charging of the storage device. Rapid charging consists in charging the electrical storage device at a high voltage and amperage, so as to charge the electrical storage device over a short time in the region of tens of minutes. Such rapid charging causes the electrical storage device to heat up to a greater extent than observed during normal operation of the storage device, something which therefore needs to be managed.

Moreover, during a phase of rapid charging, it may be necessary to maintain an acceptable level of thermal comfort inside the vehicle interior, which means to say that the refrigerant circuit may need to be able simultaneously to manage the temperature of the interior and manage the temperature of the storage device. Such demands mean the performance of the temperature management system requires that the system, in particular the heat exchanger at the front end, be of a size that is somewhat incompatible with the front end sizing constraints imposed on present-day motor vehicles, particularly vehicles powered by an electric motor.

The present invention falls within this context and aims to solve these various drawbacks by proposing a temperature management system intended for a vehicle comprising at least a refrigerant circuit and at least a heat transfer fluid loop:

the refrigerant circuit comprising at least a compression device, an expansion member, a first heat exchanger configured to exchange heat between the refrigerant and an air flow external to a vehicle interior, a second heat exchanger configured to exchange heat between the refrigerant and the heat transfer fluid circulating in the loop and a fourth heat exchanger configured to exchange heat between the refrigerant and an air flow inside the vehicle interior;

the heat transfer fluid loop comprising, on a main line, the second heat exchanger and at least a primary radiator configured to exchange heat between the air flow external to the vehicle interior and the heat transfer fluid.

The management system is characterized in that the refrigerant circuit comprises a third heat exchanger configured to exchange heat between the refrigerant and the external air flow or between the refrigerant and the heat transfer fluid and in that the first heat exchanger, the second heat exchanger and the third heat exchanger are arranged in the refrigerant circuit between an outlet of the compression device and an inlet of the expansion means.

The refrigerant circuit of the temperature management system according to the invention is configured to operate alternatively in heat pump mode, so as to heat an internal air flow before sending it into the vehicle interior, or in air-conditioning mode, in order to cool the internal air flow before sending it into the vehicle interior.

Depending on the mode of operation of the circuit of the temperature management system, the first heat exchanger and the fourth heat exchanger may thus be configured to operate as a condenser or as an evaporator with respect to the refrigerant.

Moreover, in order to optimize the efficiency of the temperature management system, at least one of the heat exchangers may be configured to ensure supercooling of the liquid refrigerant. What is meant by "supercooling" is the lowering of the temperature of the refrigerant to below its condensation temperature.

Advantageously, in the present invention, at least the second heat exchanger and/or the third heat exchanger are configured to ensure supercooling of the refrigerant circulating in the circuit.

According to the invention, the second heat exchanger and the primary radiator are arranged in the main line of the heat transfer fluid loop so that the primary radiator discharges heat energy captured by the second heat exchanger into the external air flow.

In other words, in the heat transfer fluid loop, the second heat exchanger is arranged downstream of the primary radiator according to a direction of circulation of the heat transfer fluid in the heat transfer fluid loop.

Thus, the heat energy captured by the heat transfer fluid in the second heat exchanger is discharged into the external air flow via the primary radiator, which ensures that the heat transfer fluid returns to a temperature significantly lower than the temperature of the refrigerant entering the second heat exchanger.

According to the invention, the primary radiator is arranged upstream of the first heat exchanger according to a direction of circulation of the external air flow.

In particular, the primary radiator of the heat transfer fluid loop is arranged directly upstream of the first heat exchanger of the refrigerant circuit according to the direction of circulation of the external air flow entering the front end of the vehicle such that the air flow heated by heat exchange with the primary radiator is sent directly to the first heat exchanger.

According to the invention, the heat transfer fluid loop is thermally coupled to at least one element of the electric powertrain of the vehicle.

According to another aspect of the invention, the refrigerant circuit is a closed circuit comprising at least a main branch on which are successively arranged at least the compression device, the first heat exchanger, the second heat exchanger, the third heat exchanger, the expansion member, referred to below as the first expansion member, and the fourth heat exchanger, the refrigerant circuit comprising a second branch which extends from a point of divergence, arranged between an outlet of the third heat exchanger and an inlet of the fourth heat exchanger, to a point of convergence, arranged between an outlet of the fourth heat exchanger and an inlet of the compression device, the second branch comprising at least an expansion member, referred to as the second expansion member, and a fifth heat exchanger thermally coupled to an electrical storage device of the vehicle.

The term "thermally coupled" means that the fifth heat exchanger is configured to allow direct or indirect cooling of the electrical storage device. For example, the fifth heat exchanger may be configured exchange heat between the refrigerant and the electrical storage device, the latter then being arranged in contact with the fifth heat exchanger. Alternatively, the fifth heat exchanger may be configured exchange heat between the refrigerant and the heat transfer liquid included in a second loop of the temperature management system, the second loop comprising this electrical storage device.

In this way, the temperature management system may be configured to dissipate the heat energy generated by at least one of the elements of the powertrain, such as a motor operating at least partially on electrical energy or an electronic control module controlling this motor, and/or by the electrical storage device.

Note that the qualifiers "first", "second" are intended to distinguish similar elements of said system and do not imply any hierarchy in respect of the components of the temperature management system.

According to one feature of the invention, the refrigerant circuit may comprise a third branch which extends between a point of divergence, referred to below as the second point of divergence, arranged between the outlet of the compression device and an inlet of the first heat exchanger, and a point of convergence, referred to below as the second point of convergence, arranged between the outlet of the third heat exchanger and the inlet of the fourth heat exchanger, the third branch comprising at least one heat exchanger used as a condenser.

In particular, the heat exchanger may be configured to exchange heat between the refrigerant and a heat transfer fluid circulating in a second additional heat transfer fluid loop. Alternatively, the heat exchanger may be configured to exchange heat between the refrigerant and an internal air flow intended to be sent into the interior of the vehicle so as to allow temperature management of said internal air flow.

According to the invention, the refrigerant circuit may comprise a fourth branch which extends between a point of divergence, referred to below as the third point of divergence, arranged between the outlet of the third heat exchanger and the inlet of the fourth heat exchanger, and a point of convergence, referred to below as the third point of convergence, arranged between the outlet of the compression device and the inlet of the first heat exchanger, the fourth branch comprising at least an expansion member referred to as the third expansion member.

According to one feature of the invention, the refrigerant circuit may comprise a fifth branch which extends between a point of divergence, referred to below as the fourth point of divergence, arranged between an outlet of the second heat exchanger and an inlet of the third heat exchanger, and a point of convergence, referred to below as the fourth point of convergence, arranged between the outlet of the fourth heat exchanger and the inlet of the compression device.

According to the invention, the temperature management system may further comprise an internal heat exchanger arranged between two separate portions of the refrigerant circuit, in particular a first portion, between the outlet of the compression device and the inlet of the first expansion member, in which the refrigerant is at a high pressure, and a second portion of the refrigerant circuit, between an outlet of the first expansion member and the inlet of the compression device, in which the refrigerant is at a low pressure, lower than the high pressure.

According to a first, a second and a third embodiment, the third heat exchanger is configured to exchange heat between the refrigerant and the air flow external to the vehicle interior.

According to one aspect of these embodiments, the third heat exchanger is arranged upstream of the first heat exchanger according to a direction of circulation S3 of the air flow external to the vehicle interior.

In particular, the third heat exchanger is arranged directly upstream of the first heat exchanger according to the direction of circulation of the external air flow entering the front end of the vehicle such that the air flow heated by heat exchange with the third heat exchanger is sent directly to the first heat exchanger.

According to one aspect of the first embodiment, the refrigerant circuit may comprise at least one bottle placed between the first heat exchanger and the second heat exchanger. Such a bottle ensures that only a liquid fraction of the refrigerant leaving the first heat exchanger is conveyed to the second heat exchanger. Thus, when the first heat exchanger is used as a condenser, the second heat exchanger and the third heat exchanger may be used as a supercooler for the refrigerant, thereby optimizing the coefficient of performance of the temperature management system.

According to one aspect of the second embodiment, the refrigerant circuit may comprise at least one bottle integrated in the first heat exchanger. Thus, when the first heat exchanger is operating as a condenser, at least one end section of said heat exchanger, only supplied with refrigerant in the liquid state, may be used as a supercooler for the refrigerant. As a result, the temperature management system ensures supercooling of the refrigerant three times in succession, first at the end section of the first heat exchanger, second in the second heat exchanger and third in the third heat exchanger, further optimizing the performance of the system without thereby increasing while limiting the dimensions of the various heat exchangers arranged at the front end of the vehicle.

According to the third embodiment, the heat transfer fluid loop may comprise a second line which branches off from the main line between a branch point, arranged between an outlet of the circulation element and an inlet of the primary radiator, and a connection point, arranged between an outlet of the primary radiator and an inlet of the second heat exchanger, the second line comprising at least one heat transfer fluid flow control member.

By way of example, the heat transfer fluid flow control member may be a three-way valve integrated at the branch point. Note that the heat transfer fluid flow control member makes it possible to selectively direct the heat transfer fluid to the main line or to the second line by authorizing and prohibiting the circulation of this heat transfer fluid in one or the other of these lines.

Alternatively, the heat transfer fluid loop may comprise a plurality of flow control members, for example two two-way valves, one being fitted in the main line and the other being fitted in the second line.

According to fourth and fifth embodiments, the third heat exchanger is configured to exchange heat between the refrigerant and the heat transfer fluid.

According to one aspect of these fourth and fifth embodiments, the heat transfer fluid loop comprises a branch line comprising at least the third heat exchanger and a secondary radiator configured to exchange heat between the heat transfer fluid and the external air flow, the secondary radiator being arranged upstream of the primary radiator according to the direction of circulation S3 of the air flow external to the vehicle interior.

In other words, in the heat transfer fluid loop according to these embodiments, the second heat exchanger and the third heat exchanger are arranged in parallel with one another.

In particular, the secondary radiator of the heat transfer fluid loop is arranged directly upstream of the primary radiator according to the direction of circulation S3 of the external air flow entering the front end of the vehicle such that the air flow heated by heat exchange with the secondary radiator is sent directly to the primary radiator and then to the first heat exchanger.

According to one aspect of the fourth embodiment, the branch line extends between a separation point, arranged between the outlet of the heat transfer fluid circulation element and the inlet of the primary radiator, and a joining point, arranged between the outlet of the second heat exchanger and an inlet of the circulation element.

In other words, according to the fourth embodiment, part of the heat transfer fluid is sent to the primary radiator while the other part is sent to the secondary radiator, the heat transfer fluid thus circulating in parallel, and in the same direction of circulation, in the primary radiator and in the secondary radiator.

According to one aspect of the fourth embodiment and like the third embodiment, the heat transfer fluid loop may comprise a second line which branches off from the main line between the branch point, arranged between the outlet of the circulation element and the inlet of the primary radiator, and the connection point, arranged between the outlet of the primary radiator and the inlet of the second heat exchanger, the second line comprising at least the heat transfer fluid flow control member.

According to one aspect of the fifth embodiment, the branch line may extend between the separation point, arranged between the outlet of the primary radiator and the inlet of the second heat exchanger, and the joining point, arranged between the outlet of the second heat exchanger and the inlet of the circulation element.

In other words, the fifth embodiment, unlike the fourth embodiment, ensures that part of the heat transfer fluid circulates successively in the primary radiator then in the secondary radiator, so as to further cool said heat transfer fluid and therefore to optimize the performance of the temperature management system.

The present invention also relates to a motor vehicle comprising at least one temperature management system as set out above.

Other features, details and advantages will become more clearly apparent on reading the detailed description provided below by way of indication in relation to the various exemplary embodiments illustrated in the following figures:

FIG. 1 schematically depicts a temperature management system according to a first and a second embodiment, this temperature management system comprising at least a refrigerant circuit and a heat transfer fluid loop;

FIG. 2 schematically depicts a first example of the operation of the temperature management system shown in FIG. 1, in which the refrigerant circuit is operating in vehicle interior cooling mode;

FIG. 3 schematically depicts a second example of the operation of the temperature management system shown in FIG. 1, in which the refrigerant circuit is operating in a mode for cooling an electrical storage device of the vehicle;

FIG. 4 schematically depicts the temperature management system according to a third embodiment;

Figure 1:
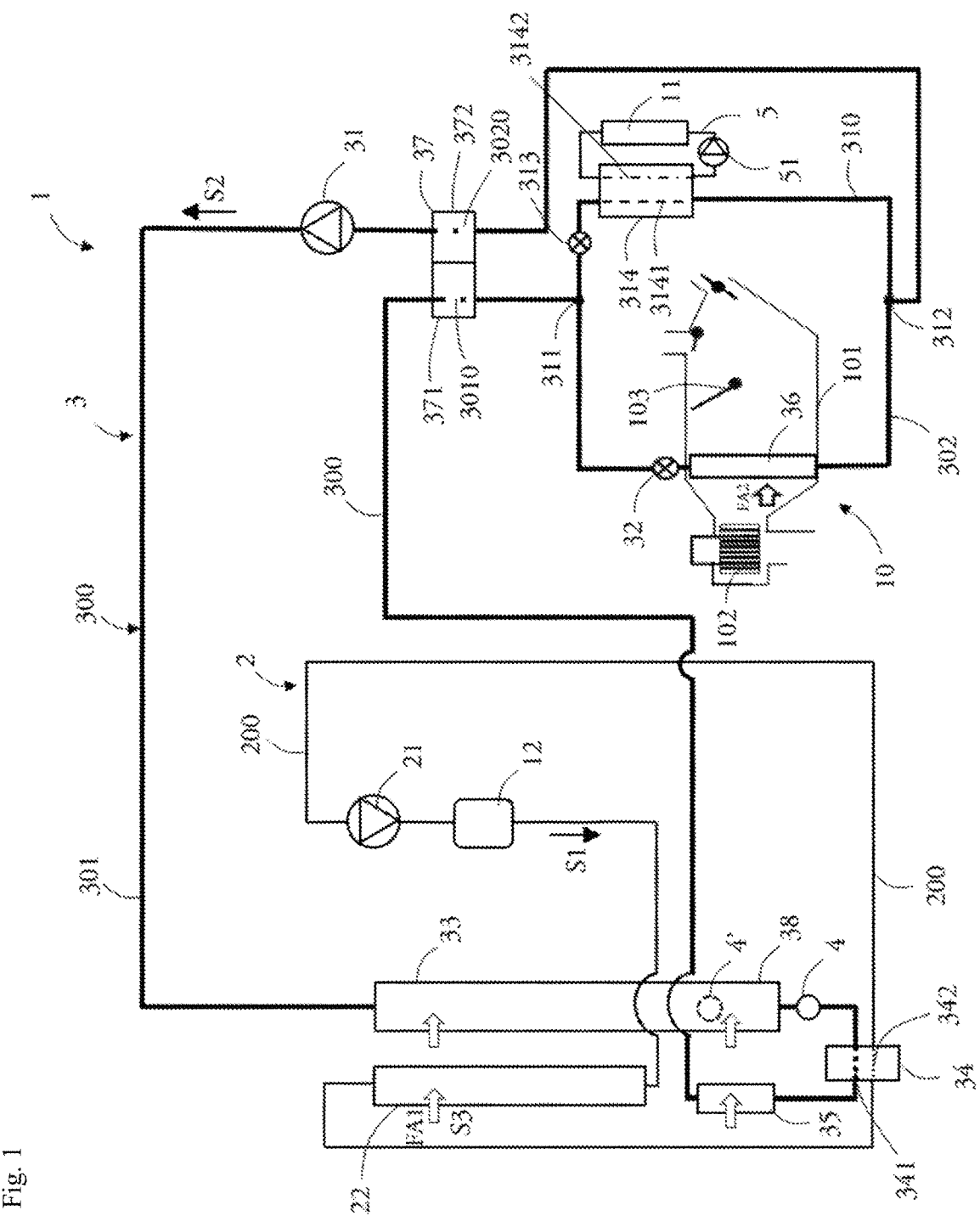
Figure 7:
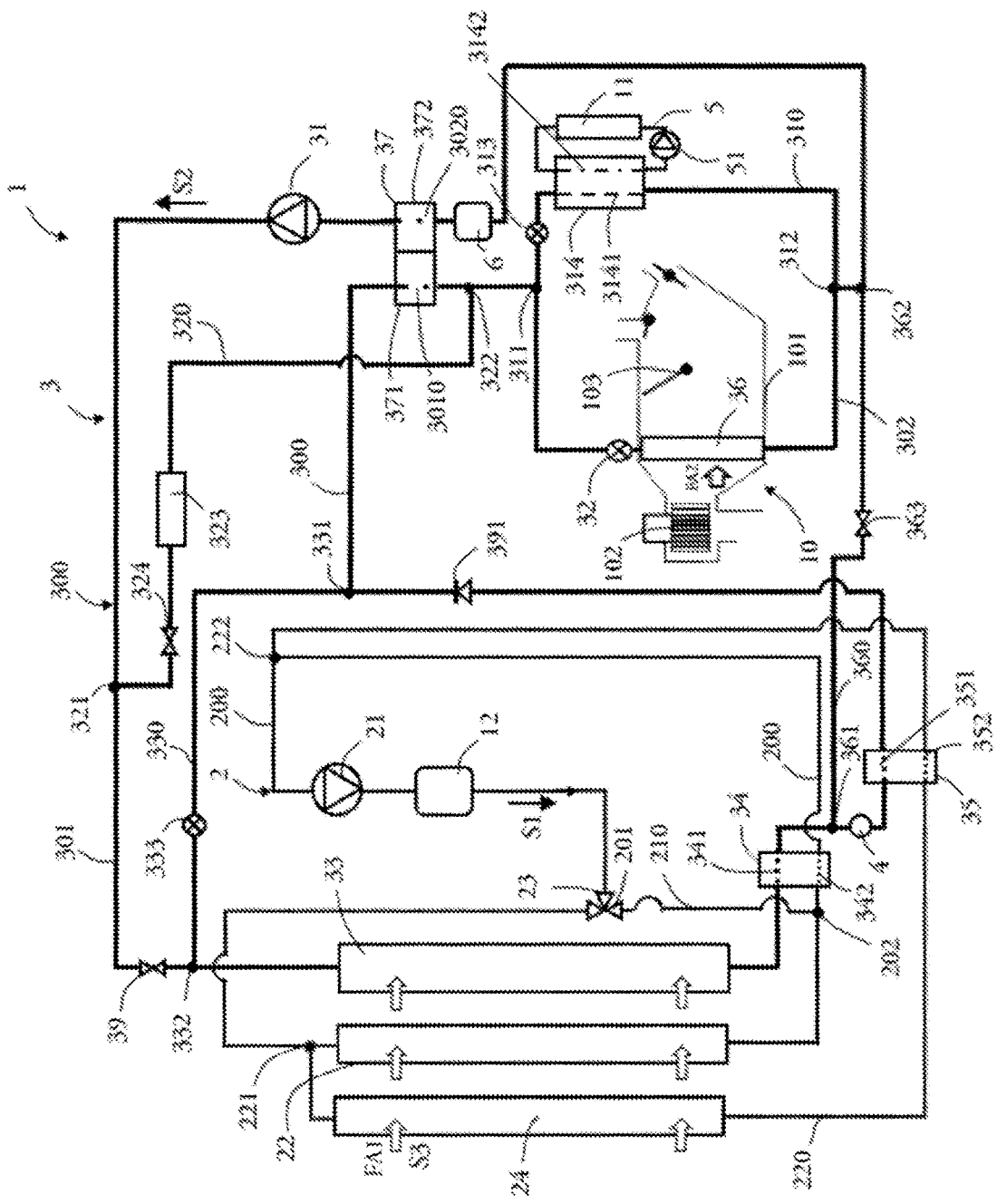
Figure 8:
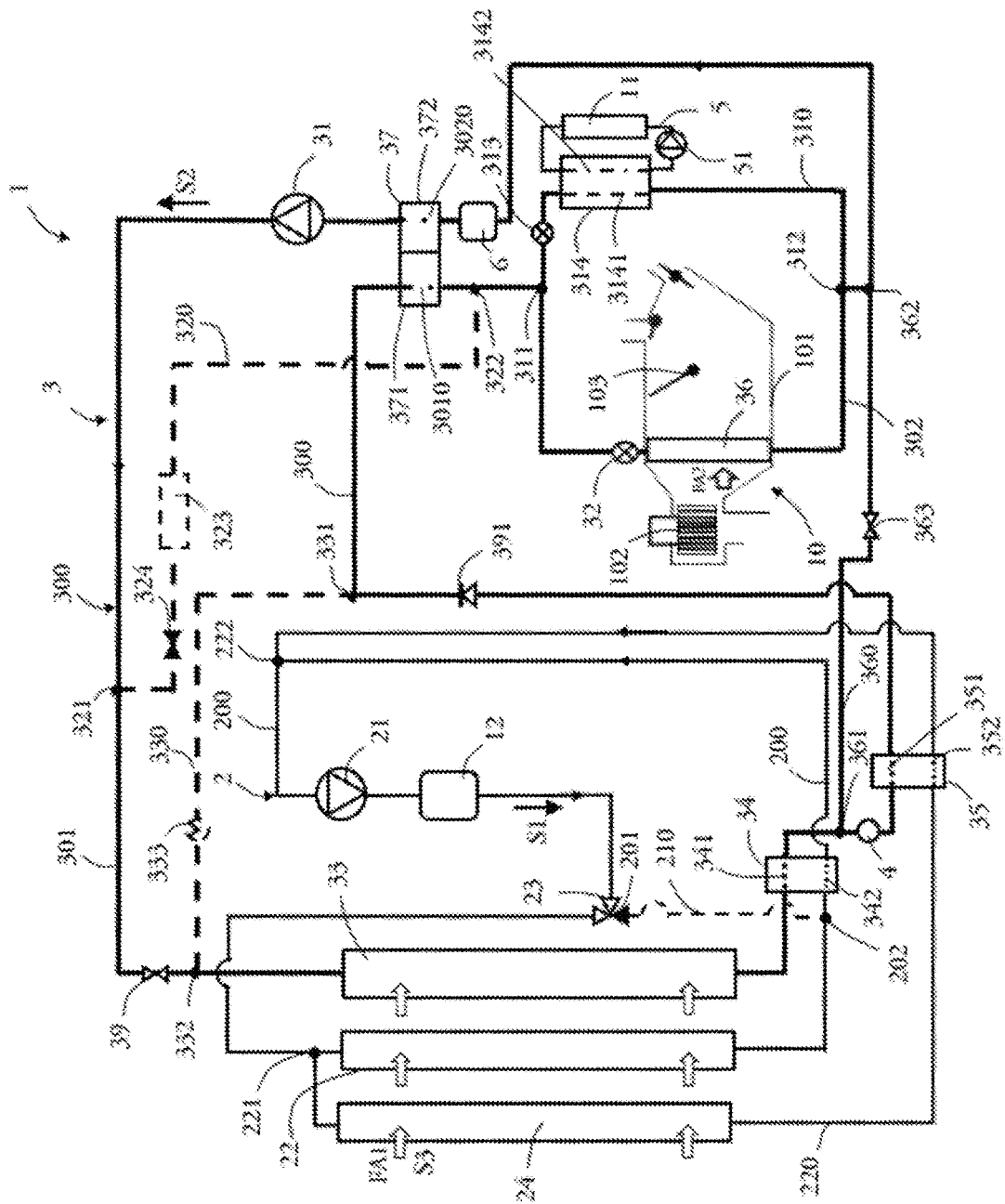
Figure 9:
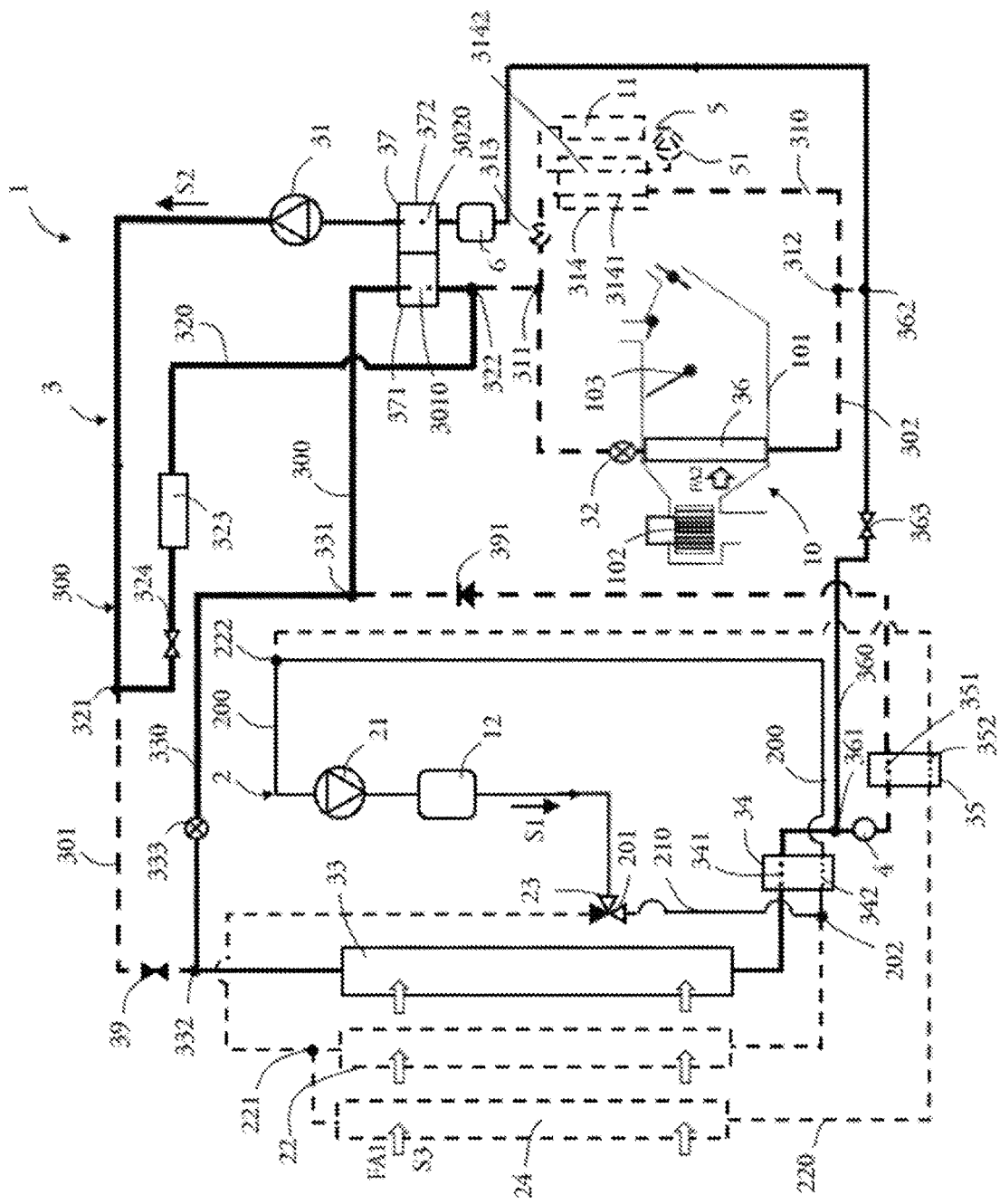
Figure 10:
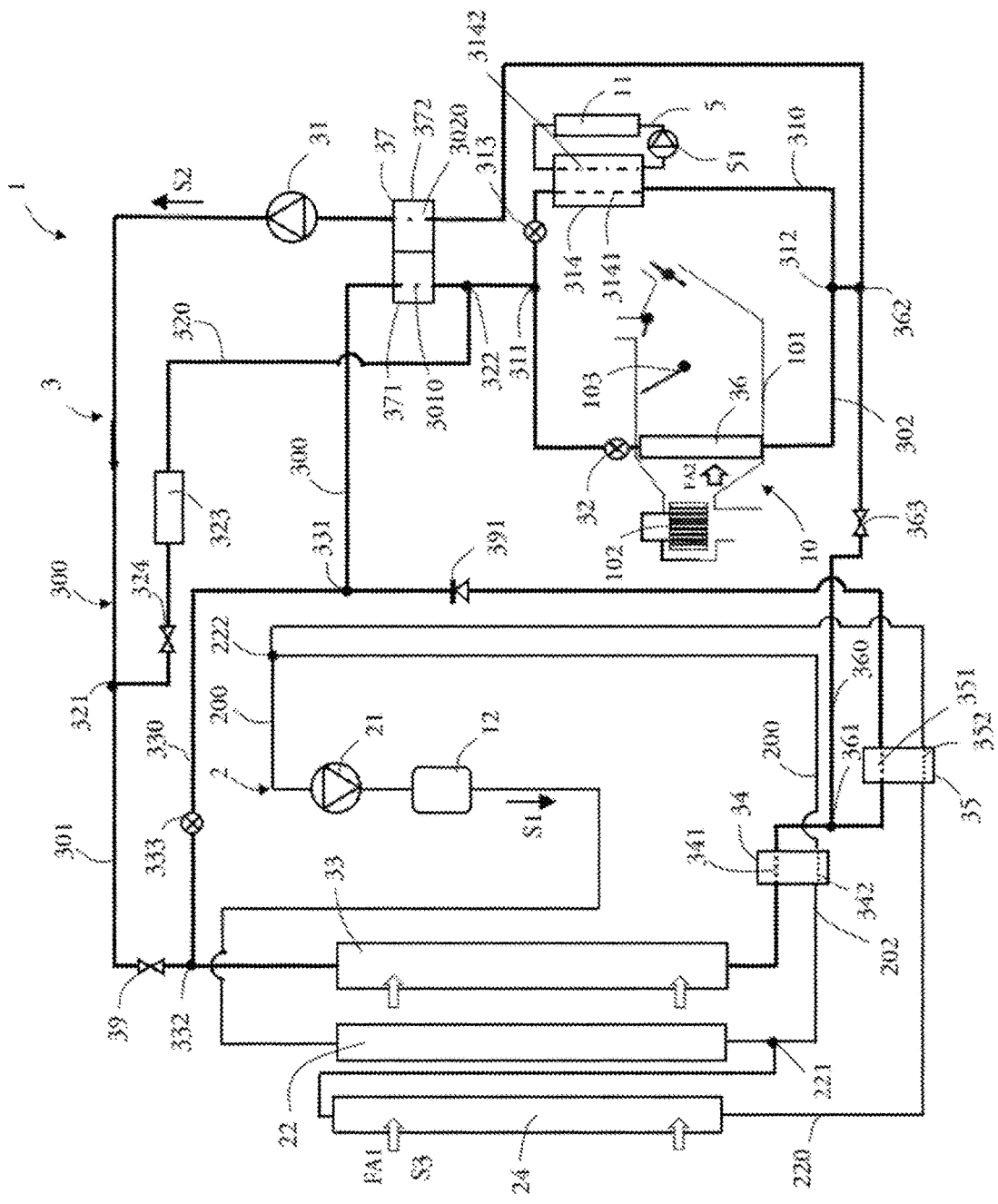
Figure 11:
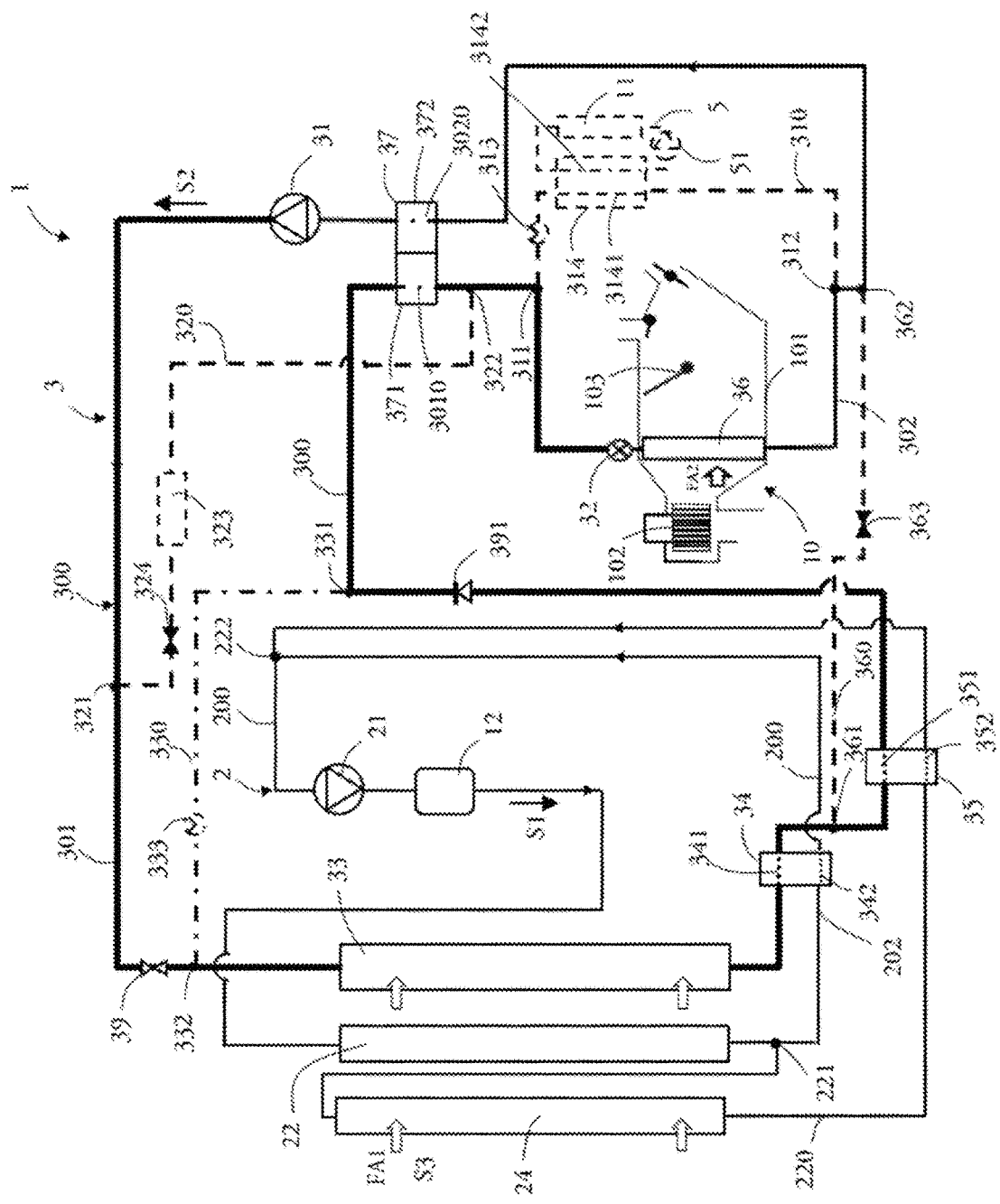

FIG. 7 schematically depicts the temperature management system according to a fourth embodiment;

FIG. 8 schematically depicts the temperature management system shown in FIG. 7, when it is operating in vehicle interior cooling mode;

FIG. 9 schematically depicts the temperature management system shown in FIG. 7, when the refrigerant circuit is operating in vehicle interior heating mode;

FIG. 10 schematically depicts the temperature management system according to a fifth embodiment;

FIG. 11 schematically depicts a first example of the operation of the temperature management system shown in FIG. 10, in which the refrigerant circuit is operating in vehicle interior cooling mode;

FIG. 1 schematically depicts a system 1 for the temperature management of various functions of a motor vehicle, including at least a vehicle-interior heating, ventilation and/or air-conditioning installation 10, an electrical storage device 11 and at least an element 12 of an electric powertrain of the vehicle. The temperature management system 1 comprises a loop 2 for heat transfer fluid, for example glycol water, and a refrigerant circuit 3 which is intended in particular for the temperature management of a vehicle interior.

Throughout the description, the terms "upstream", "downstream", "inlet" and "outlet" refer to a direction of circulation S1 of the heat transfer fluid in the heat transfer fluid loop 2, or to a direction of circulation S2 of the refrigerant in the refrigerant circuit 3, or to a direction of circulation S3 of an air flow FA1 external to the vehicle interior.

The refrigerant circuit 3 consists of a closed circuit which comprises at least a main branch 300 on which are arranged at least a compression device 31, intended to raise the pressure of the refrigerant, and an expansion member 32, referred to as the first expansion member 32, intended to reduce the pressure of the refrigerant. The refrigerant circuit 3 further comprises at least a first heat exchanger 33 configured to exchange heat between the refrigerant and the air flow FA1 external to the vehicle interior, at least a second heat exchanger 34 configured to exchange heat between the refrigerant and the heat transfer fluid circulating in the loop 2, a third heat exchanger 35 configured to exchange heat between the refrigerant and the external air flow FA1 or between the refrigerant and the heat transfer fluid, and a fourth heat exchanger 36 configured to exchange heat between the refrigerant and an internal air flow FA2 inside the vehicle interior.

In particular, according to the present invention, the first heat exchanger 33, the second heat exchanger 34 and the third heat exchanger 35 are arranged in the refrigerant circuit 3 between an outlet of the compression device 31 and an inlet of the first expansion member 32. In the first embodiment as shown in FIG. 1, the third heat exchanger 35 is configured to exchange heat between the refrigerant and the external air flow FA1 and it is arranged upstream of the first heat exchanger 33 according to the direction of circulation S3 of the air flow FA1 external to the vehicle interior.

The heat transfer fluid loop 2 consists of a closed loop comprising a main line 200 on which are arranged a circulation element 21 for circulating the heat transfer fluid, such as a pump, at least the second heat exchanger 34 and at least a primary radiator 22 configured to exchange heat between the air flow FA1 external to the vehicle interior and the heat transfer fluid. Note that the various fluids circulating through the second heat exchanger 34 do not mix and that the exchange of heat between these two fluids is achieved by conduction.

Furthermore, the heat transfer fluid loop 2 is thermally coupled to at least one element 12 of the electric powertrain of the vehicle, for example at least an electric motor or a control module controlling said motor, so as to be able to ensure temperature management, in particular cooling, thereof.

Thus, within the temperature management system 1, the primary radiator 22 of the heat transfer fluid loop 2 and the first heat exchanger 33 of the refrigerant circuit 3 are exposed to the external air flow FA1, the primary radiator 22 being, according to the invention, arranged upstream of the first heat exchanger 33 according to the direction of circulation S3 of the external air flow FA1. Advantageously, the primary radiator 22 and the first heat exchanger 33 are arranged at the front end of the vehicle. Alternatively, they could also be installed on a roof of the vehicle, in a rear wing and, more generally, in any region of the vehicle where the external air flow FA1 can sweep over them.

The refrigerant circuit 3 thus comprises the main branch 300 on which are successively arranged, according to the direction of circulation S2 of the refrigerant, the compression device 31, the first heat exchanger 33, the second heat exchanger 34, the third heat exchanger 35, the first expansion member 32, and the fourth heat exchanger 36. The refrigerant circulating in a first portion 301 of the refrigerant circuit 3, between the outlet of the compression device 31 and the inlet of the first expansion member 32, is at a high pressure, while the refrigerant circulating in a second portion 302 of the circuit, between an outlet of the first expansion member 32 and an inlet of the compression device 31, is at a low pressure, lower than the high pressure.

Advantageously, the refrigerant circuit 3 may comprise, between an outlet of the first heat exchanger 33 and an inlet of the second heat exchanger 34, at least one bottle 4. Such a bottle 4 ensures that only a liquid fraction of the refrigerant leaving the first heat exchanger 33 is conveyed to the second heat exchanger 34 such that, when the first heat exchanger 33 is used as a condenser, the second heat exchanger 34 and/or the third heat exchanger 35 may be used as a supercooler for the refrigerant.

Advantageously, the refrigerant circuit 3 of the temperature management system 1 comprises an internal heat exchanger 37. This internal heat exchanger 37 allows the recovery of heat energy from a portion of the refrigerant circuit 3, in this case the first portion 301, so that it can be exchanged with another portion of this same circuit, in this case the second portion 302, so as to reduce the power consumed by the compression device 31 and increase overall the performance of the refrigerant circuit 3.

There are a first pipe 3010 of the first portion 301, in which the refrigerant is at a high pressure and high temperature, and a second pipe 3020, included in the second portion 302, in which the refrigerant is at a low pressure, lower than the high pressure, and low temperature. In the example illustrated, the first pipe 3010 and the second pipe 3020 respectively comprise a first part 371 and a second part 372 of the internal heat exchanger 37.

As the internal heat exchanger 37 is arranged between two pipes 3010, 3020 having a temperature differential between them, it is understood that it thus allows an exchange of heat between its two parts 371, 372 and therefore between the two pipes 3010, 3020 of the refrigerant circuit 3 on which these parts 371, 372 are arranged. In the example illustrated, the first part 371 of the internal heat exchanger 37 is arranged between an outlet of the third heat exchanger 35 and the inlet of the first expansion member 32 and the second part 372 of this internal heat exchanger 37 is arranged between an outlet of the fourth heat exchanger 36 and the inlet of the compression device 31, allowing on the one hand heating of the refrigerant upstream of the compression device 31 so that this refrigerant is exclusively in gaseous form when it reaches the inlet of the compression device 31, and on the other hand cooling of the refrigerant upstream of the first expansion member 32, facilitating the fall in pressure caused by this expansion member 32. The overall efficiency of the refrigerant circuit 3 is thus improved in the presence of this internal heat exchanger 37.

The refrigerant circuit 3 comprises a second branch 310 which diverges from the main branch 300 and extends between a point of divergence, referred to as the first point of divergence 311, arranged between the outlet of the third heat exchanger 35 and an inlet of the fourth heat exchanger 36, and a point of convergence, referred to as the first point of convergence 312, arranged between the outlet of the fourth heat exchanger 36 and the inlet of the compression device 31.

The second branch 310 comprises, in succession, according to the direction of circulation S2 of the refrigerant, an expansion member, referred to as the second expansion member 313, and a fifth heat exchanger 314 thermally coupled to the electrical storage device 11 of the vehicle which is configured to at least supply electrical power to the element 12 of the electric powertrain of said vehicle. The fifth heat exchanger 314 is thus arranged in parallel with the fourth heat exchanger 36 from the refrigerant viewpoint.

Note that the electrical storage device 11 is arranged close to, or advantageously in thermal contact with, the fifth heat exchanger 314 and that the latter is configured to exchange heat between the refrigerant circulating in the second branch 310 and a second heat transfer fluid loop 5 comprising the electrical storage device 11 and configured to cool same. By way of example, the heat transfer fluid present in this second loop may be circulated by a circulator 51.

FIG. 1 also shows the heating, ventilation and/or air-conditioning installation 10, which comprises a housing 101 delimiting an internal volume. The internal air flow FA2 is channeled through this housing 101 before being sent into the vehicle interior.

The housing 101 in particular houses the fourth heat exchanger 36 and may, for example, house at least one exchanger configured to manage the temperature of an internal air flow sent to the vehicle interior. The heating, ventilation and/or air-conditioning installation 10 also includes a fan 102 for setting in motion the internal air flow FA2 in the housing 101, along with mixing or distribution flaps generally designated by the reference 103.

Figure 2:
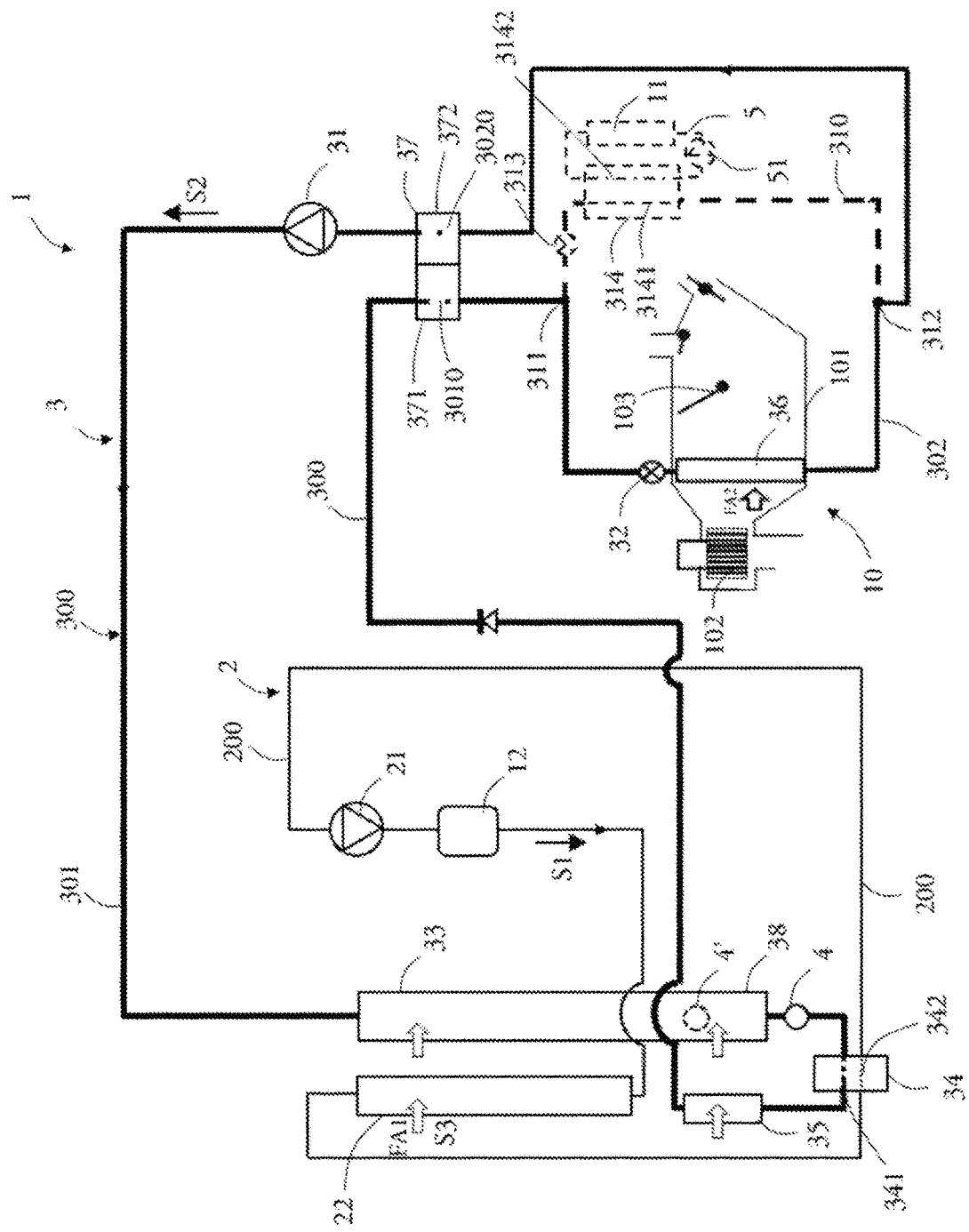
Figure 3:
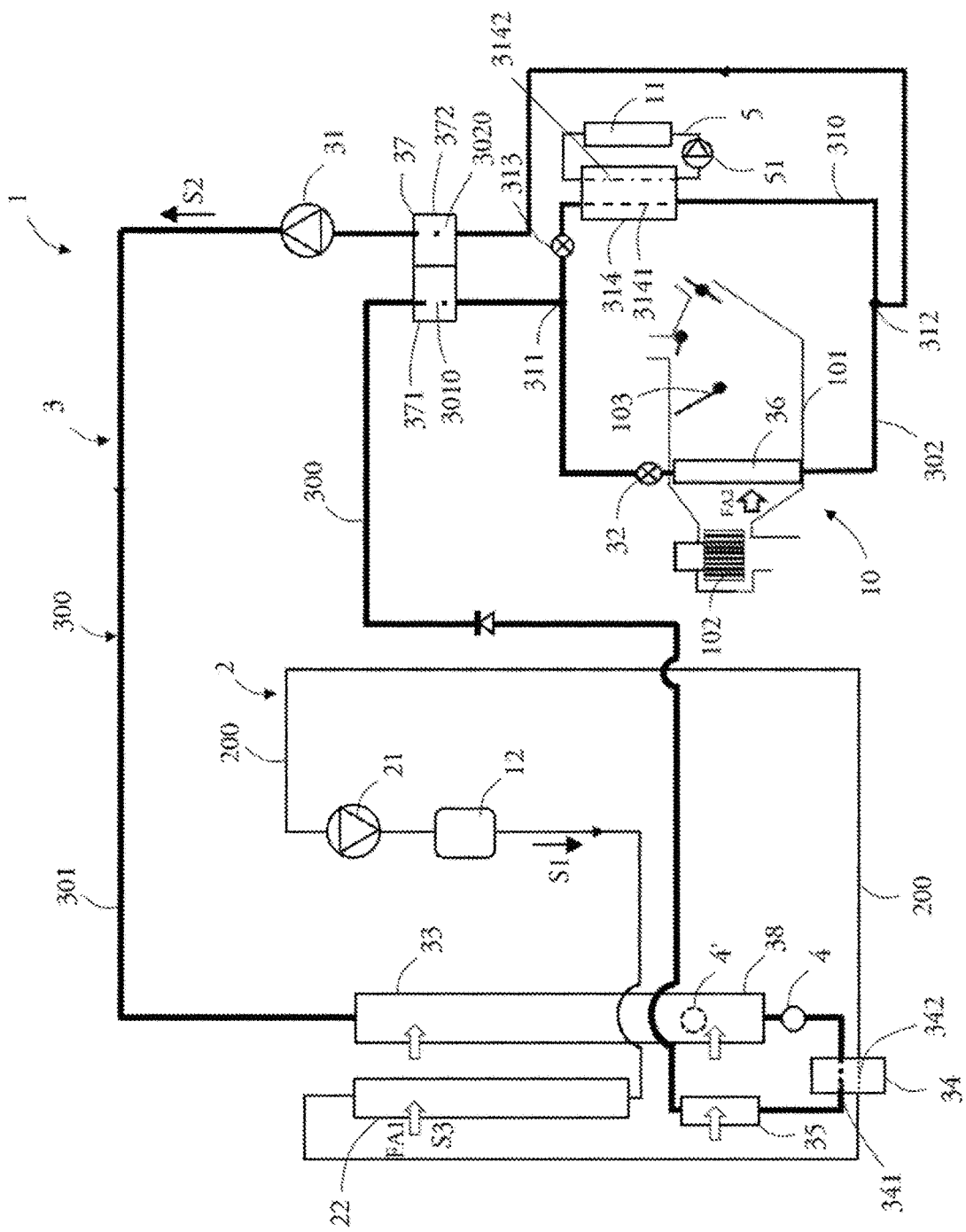

FIGS. 2 and 3 describe examples of distinct operating modes of the temperature management system 1 as set out above, that is to say produced according to the first embodiment. In these figures, the solid lines represent pipes of the temperature management system 1 in which the refrigerant or the heat transfer fluid circulates, while the dotted lines represent pipes of the temperature management system 1 in which neither the refrigerant nor the heat transfer fluid circulates. The external air flow FA1 and its direction of circulation S3, the internal air flow FA2, the direction of circulation S1 of the heat transfer fluid in the heat transfer fluid loop 2 and the direction of circulation S2 of the refrigerant in the refrigerant circuit 3 are also shown schematically in the various FIGS. 1 to 11. Members or devices for regulating the flow of the various fluids are shown as solid where they block the circulation of the fluid concerned, and as hollow where they allow said circulation.

FIG. 2 shows a first example of the operation of the temperature management system 1 according to the first embodiment, in which the refrigerant circuit 3 is configured to operate in air-conditioning mode, i.e. is configured to cool the internal air flow FA2 before it is sent into the vehicle interior.

In the refrigerant circuit 3, the circulation of the refrigerant is confined to the main branch 300. The second branch 310 is not traversed by the refrigerant. By way of example, the circulation of the refrigerant may be impeded in said branches by at least the second expansion member 313 and/or by a member for regulating the flow of refrigerant such as a two-way valve or a three-way valve.

The refrigerant leaves the compression device 31 at a high pressure, a high temperature, and in the gaseous state and heads for the first heat exchanger 33 which operates as a condenser. Since the temperature of the refrigerant is higher than the temperature of the external air flow FA1 passing through the first heat exchanger 33, it gives up its heat energy to the external air flow FA1. The refrigerant thus cooled leaves the first heat exchanger 33 mainly in the liquid state and enters the bottle 4 which is configured to send only a liquid portion of the refrigerant to the second heat exchanger 34. Due to the presence of the bottle 4, the second heat exchanger 34 operates as a supercooler, i.e. it cools the refrigerant circulating in a first pass 341 of the second heat exchanger 34 to a temperature at least lower than its condensation temperature by heat exchange with the heat transfer fluid, which is colder, circulating in a second pass 342 of the second heat exchanger 34.

In particular, note that the heat transfer fluid circulating in the second pass 342 of the second heat exchanger 34 in this case comes from the primary radiator 22, through which the external air flow FA1 passes first, such that the temperature of the heat transfer fluid is lowered to a temperature close to that of the external air flow FA1, thus ensuring a first efficient supercooling of the refrigerant circulating in the second heat exchanger 34 before it is sent to the third heat exchanger 35 for a second supercooling.

In the third heat exchanger 35, the cooled refrigerant, which is warmer than the external air flow, thus gives up heat energy to the latter and leaves the third heat exchanger 35 at a temperature lower than that observed at the outlet of the second heat exchanger 34.

In the present embodiment, the third heat exchanger 35 is advantageously arranged upstream of the first heat exchanger 33 according to the direction of circulation S3 of the external air flow. In this way, the external air flow FA1 involved in the heat exchange in the third heat exchanger 35 has a temperature lower than that of the external air flow FA1 involved in the heat exchange in the first heat exchanger 33, which has previously been heated. The temperature pinch between the refrigerant and the external air flow FA1 specific to the first heat exchanger 33 is thus reduced compared to the temperature pinch observed in the third heat exchanger 35. Such an arrangement helps increase the capacity of the temperature management system 1, in particular by allowing, for the supply of the same cold power, a reduction in the speed of rotation of the compression device 31, which is accompanied by a reduction in the electricity consumption of said device 31 as well as a reduction in any noise in the vehicle interior which may result from a high rotational speed of the compressor.

The supercooled refrigerant is then sent to the first part 371 of the internal heat exchanger 37 where, as previously explained, it gives up heat energy to the colder refrigerant circulating in the second part 372 of the internal heat exchanger 37. The cooled refrigerant then circulates through the first expansion member 32 in which it experiences a fall in pressure.

The refrigerant, at a low pressure, reaches the fourth heat exchanger 36, used as an evaporator, in which it is evaporated by capturing heat energy from the internal air flow FA2. The internal air flow FA2 thus cooled is then sent to the vehicle interior, while the refrigerant leaves the fourth heat exchanger 36 heated and at least partially in the gaseous state. The refrigerant then reaches the second part 372 of the internal heat exchanger 37, where it captures the heat energy from the refrigerant circulating in the first part 371 of the internal heat exchanger 37, before being returned to the compression device 31.

Alternatively, the refrigerant circuit 3 may comprise, between the outlet of the fourth heat exchanger 36 and an inlet of the second part 372 of the internal heat exchanger 37, an accumulation device (not shown) in which the liquid phase and the gaseous phase are separated so that only the gaseous phase is then sent to the second part 372 of the internal heat exchanger 37 and then, again, to the compression device 31.

In the heat transfer fluid loop 2, the heat transfer fluid is circulated by the circulation element 21, captures heat energy from at least one of the elements 12 of the powertrain of the electric vehicle, and then discharges this heat energy into the external air flow at the primary radiator 22. The cooled heat transfer fluid then enters the second heat exchanger 34 in which, as explained above, it captures the heat energy from the refrigerant circulating in the first pass 341 of the second heat exchanger 34.

The heat transfer fluid leaving the second heat exchanger 34 is then returned to the circulation element 21, the second heat exchanger 34 and the primary radiator 22 being thus arranged in the heat transfer fluid loop 2 such that, from one cycle to another, the primary radiator 22 discharges into the external air flow FA1 heat energy captured by the second heat exchanger 34 but also by the element 12 of the electric powertrain.

FIG. 3 shows a second example of the operation of the temperature management system 1. This second example of operation is substantially similar to that described above in that the refrigerant circuit 3 operates in air-conditioning mode and the description given of these elements with reference to FIG. 2 may therefore be transposed to the present example of operation. This second example of operation differs from the first example of operation in that the temperature management system 1 is configured to manage the temperature of the electrical storage device 11 simultaneously with the temperature management of the vehicle interior. To this end, the second branch 310 of the refrigerant circuit 3 is also traversed by the refrigerant. In other words, the secondary second expansion member 313 allows the circulation of the refrigerant in said second branch 310.

Thus, when the refrigerant arrives at the first point of divergence 311, part of the refrigerant is directed to the first expansion member 32 and to the fourth heat exchanger 36, as described with reference to FIG. 2, and another part of this refrigerant is directed to the second expansion member 313 of the second branch 310, in which its pressure is lowered, before reaching the fifth heat exchanger 314. In the fifth heat exchanger 314, the refrigerant, circulating in a first pass 3141 of the fifth heat exchanger 314, captures heat energy from the heat transfer fluid circulating in a second pass 3142 of the fifth heat exchanger 314, which is warmer than the refrigerant.

The refrigerant leaves the fifth heat exchanger 314 and reaches the first point of convergence 312 so as to be directed to the compression device 31. At the same time, the heat transfer fluid that has been cooled in the fifth heat exchanger 314 circulates in the second heat transfer fluid loop 5 so as to cool the electrical storage device 11.

Such a mode of operation may in particular be implemented during a phase of rapid charging of the electrical storage device 11 so that it does not heat up so much, the temperature management system 1 thus simultaneously ensuring temperature management of said electrical storage device 11 and maintaining an acceptable level of thermal comfort inside the vehicle interior.

According to a second embodiment, substantially identical to the first embodiment as set forth with reference to FIGS. 1 to 3, the temperature management system 1 may be configured such that the bottle is integrated in the first heat exchanger 33 and not arranged between the outlet of the first heat exchanger 33 and the inlet of the second heat exchanger 34. This alternative is shown in FIGS. 1 to 3 by the bottle 4', illustrated in dotted lines in the first heat exchanger 33.

With this arrangement, an end section 38 of the first heat exchanger 33, comprising the outlet of the first heat exchanger 33, is only supplied with refrigerant in the liquid state by the bottle 4'. It follows from such an architecture that, when the refrigerant circuit 3 of the temperature management system 1 operates in air-conditioning mode, substantially identical to that previously described with reference to FIG. 2, or in a mode combining air-conditioning with temperature management of an electrical storage device 11, as described above with reference to FIG. 3, the first heat exchanger 33 operates partially as a supercooler. In particular, a first section of the first heat exchanger 33 operates, as explained above, as a condenser, while the end section 38 operates as a supercooler.

The refrigerant circulating in the temperature management system 1 is thus supercooled three times in succession, respectively in the first heat exchanger 33, in the second heat exchanger 34 and in the third heat exchanger 35, and the thermal requirements of the temperature management system 1 may be reduced.

Figure 4:
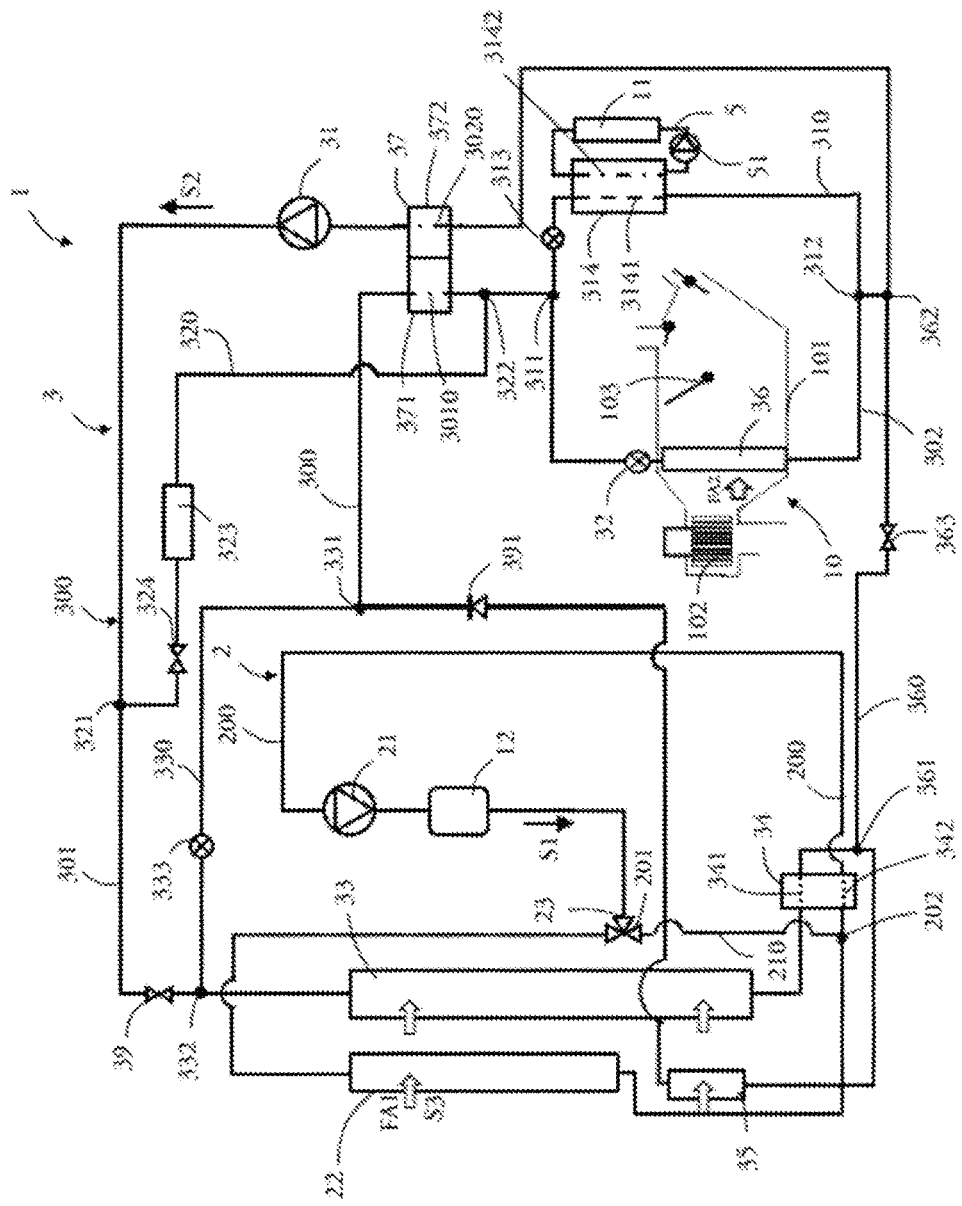
Figure 5:
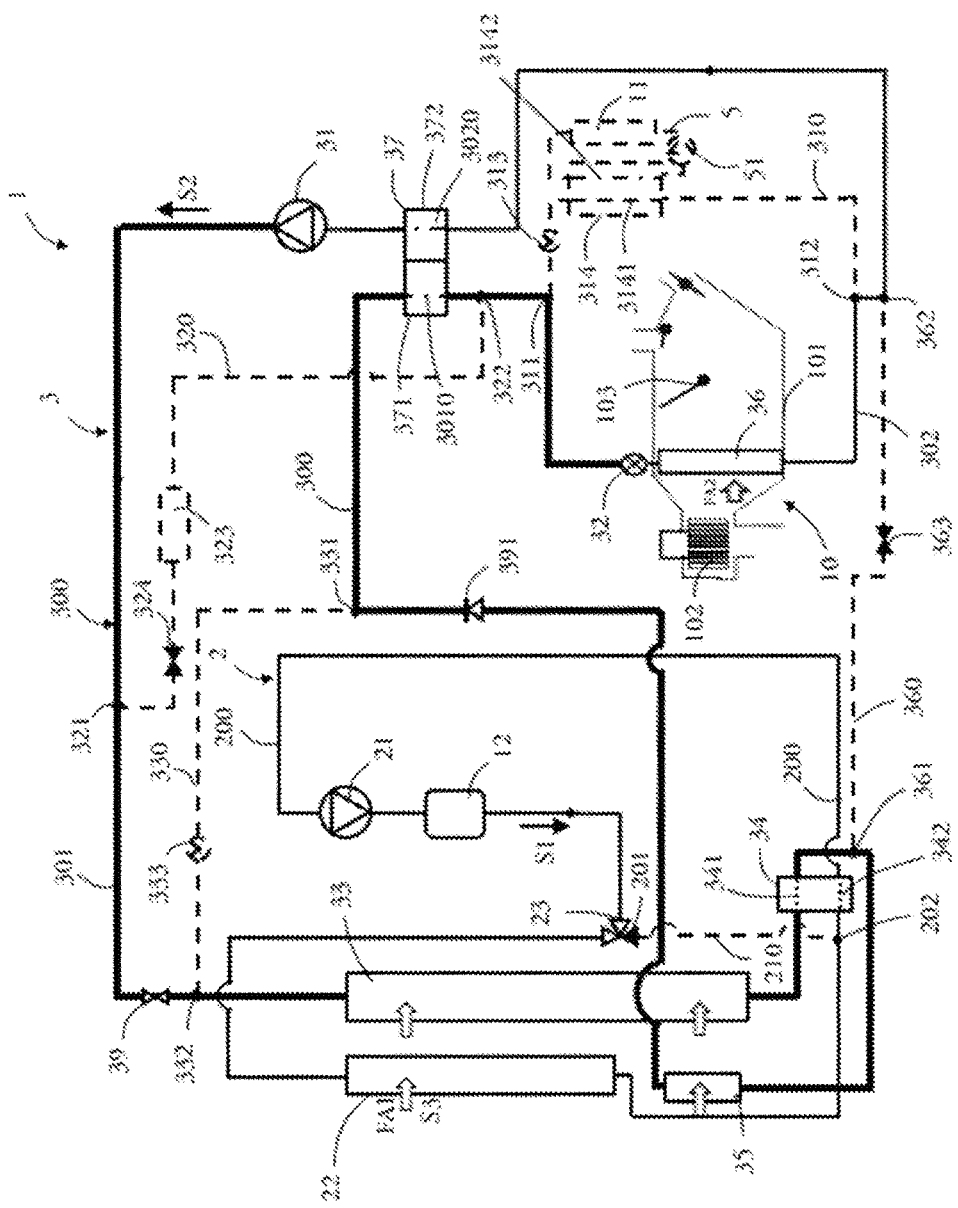
FIG. 5 shows the temperature management system according to FIG. 4, when it is implementing the first mode of operation, i.e. cooling of the vehicle interior.
Figure 6:
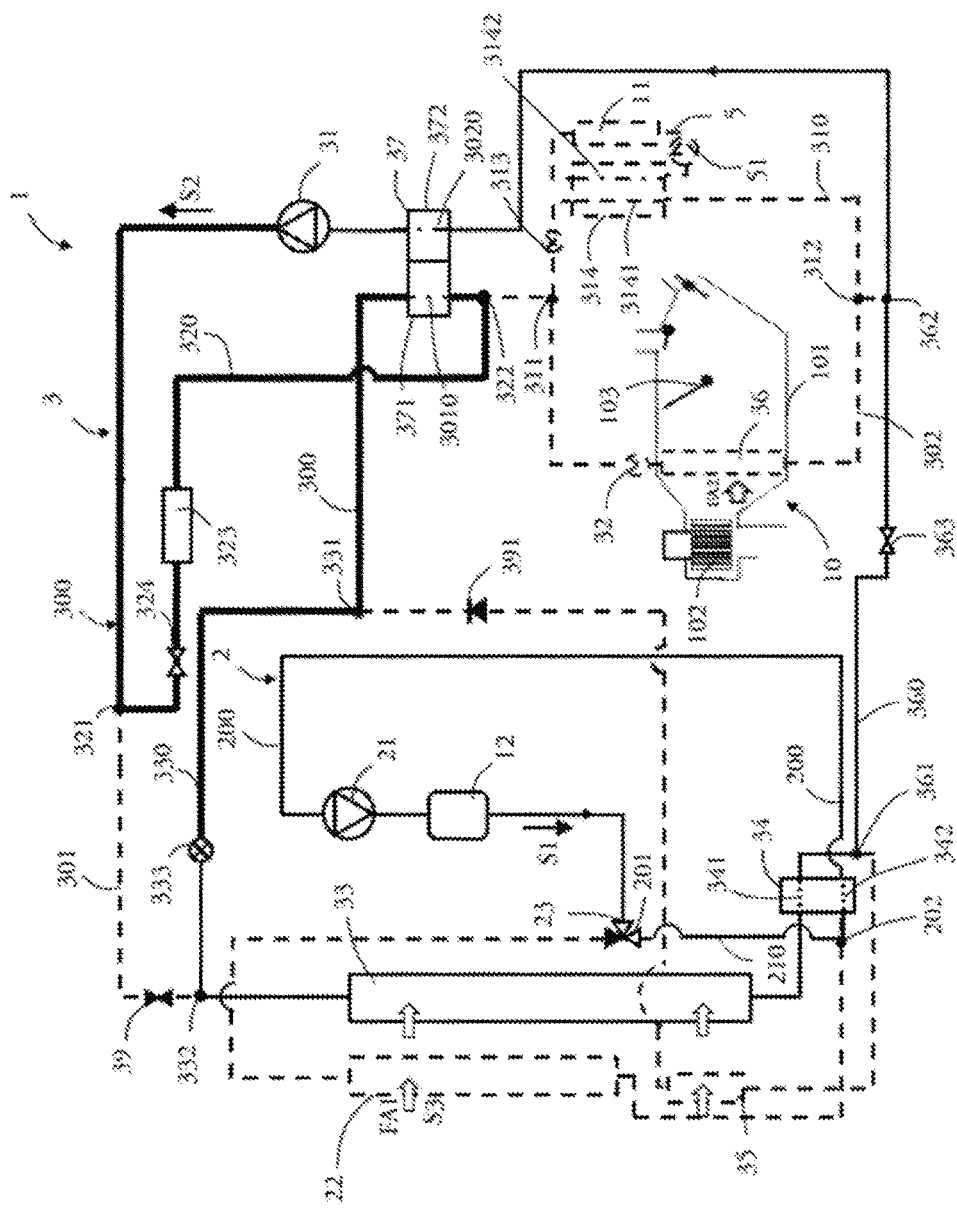
FIG. 6 shows the temperature management system according to FIG. 4, when it is implementing a third mode of operation and the refrigerant circuit is operating in vehicle interior heating mode.

FIGS. 4 to 6 show a third embodiment of the temperature management system 1. In the temperature management system 1 as shown in FIG. 6, the main branch 300 and the second branch 310 of the refrigerant circuit 3 as well as the various components that they comprise are identical to what has been described in detail with reference to FIGS. 1 to 3 except that the refrigerant circuit 3 does not have a bottle 4.

Similarly to what was described above, the refrigerant circuit 3 may comprise, between the outlet of the fourth heat exchanger 36 and the inlet of the second part 372 of the internal heat exchanger 37, an accumulation device (not shown) in which the liquid phase and the gaseous phase are separated so that only the gaseous phase is then sent to the second part 372 of the internal heat exchanger 37 and then, again, to the compression device 31.

The refrigerant circuit 3 comprises a third branch 320 which extends between a point of divergence, referred to below as the second point of divergence 321, arranged between the outlet of the compression device 31 and an inlet of the first heat exchanger 33, and a point of convergence, referred to below as the second point of convergence 322, arranged between the outlet of the third heat exchanger 35 and the inlet of the fourth heat exchanger 36. The third branch 320 comprises at least one heat exchanger 323 configured to be used at least as a condenser. By way of example, the heat exchanger 323 may exchange heat between the refrigerant and the heat transfer fluid or between the refrigerant and an air flow intended to be sent to the vehicle interior.

The third branch 320 in particular allows the fourth heat exchanger 36 to be bypassed, such a bypass being able in particular to be implemented when the circuit operates in heating mode in order to send a flow of hot air into the vehicle interior. To this end, the third branch 320 may comprise a member 324 for regulating the flow of refrigerant, for example a two-way valve, configured to direct the refrigerant to the main branch 300 or to the third branch 320.

The refrigerant circuit 3 also comprises a fourth branch 330 which extends between a point of divergence, referred to below as the third point of divergence 331, arranged between the outlet of the third heat exchanger 35 and the inlet of the fourth heat exchanger 36, and a point of convergence, referred to below as the third point of convergence 332, arranged between the outlet of the compression device 31 and the inlet of the first heat exchanger 33. The fourth branch 330 comprises at least one expansion member referred to as the third expansion member 333.

Lastly, the refrigerant circuit 3 comprises a fifth branch 360 which extends between a point of divergence, referred to below as the fourth point of divergence 361, arranged between an outlet of the second heat exchanger 34 and an inlet of the third heat exchanger 35, and a point of convergence, referred to below as the fourth point of convergence 362, arranged between the outlet of the fourth heat exchanger 36 and the inlet of the compression device 31. The fifth branch 360 also contributes to bypassing the fourth heat exchanger 36, in particular when the refrigerant circuit 3 is operating in heating mode, as explained below. In particular, the fifth branch 360 may comprise at least a member 363 for regulating the flow of refrigerant, for example a two-way valve, configured to direct the refrigerant to the main branch 300 or to the fifth branch 360.

The heat transfer fluid loop 2 of this temperature management system 1 differs from the first and second embodiments in that it comprises, in addition to the main line 200, a second line 210 branching off from said main line 200. The second line 210 extends between a branch point 201, arranged between an output of the circulation element 21 and an input of the primary radiator 22, and a connection point 202, arranged between an output of the primary radiator 22 and the inlet of the second heat exchanger 34. The second line 210 comprises at least one heat transfer fluid flow control member 23 configured to selectively direct the heat transfer fluid to the main line 200 and/or to the second line 210. In the example illustrated, the control device 23 is a three-way valve arranged at the branch point 201. Alternatively, the heat transfer fluid loop 2 may comprise two heat transfer fluid flow control members 23, for example two two-way valves, arranged in the main line 200 and in the second line 210.

FIG. 5 shows the third embodiment when it is operating according to the first mode of operation of the temperature management system 1, i.e. when the refrigerant circuit 3 is configured to operate in air-conditioning mode. In such a mode of operation, the circulation of the refrigerant in the refrigerant circuit 3 is identical to that of the first and second modes of operation, the description provided with reference to FIG. 2 thus being transposable to the present embodiment, and the circulation of the refrigerant is confined to the main branch 300. The second branch 310, the third branch 320, the fourth branch and the fifth branch are not traversed by the refrigerant, as the circulation of the refrigerant through said branches may be impeded by at least one of the expansion members 313, 333 and/or one of the members or devices 324, 353 for regulating the flow of the refrigerant circuit 3 included in the corresponding branches.

For example, when the refrigerant arrives at the second point of divergence 321, the combination of the closing of the third regulating member 324 of the third branch 320 and the opening of a regulating member 39 of the main branch 300 prevents the circulation of refrigerant in the third branch 320. As a result, the refrigerant circulates in the main branch 300 toward the first heat exchanger 33 which operates as a condenser. Similarly, when the liquid refrigerant leaving the second heat exchanger 34 passes the fourth point of divergence 361, the closure of the flow regulation device 353 of the fifth branch 360 sends the refrigerant to the third heat exchanger 35. The same applies to the refrigerant leaving the third heat exchanger 35 which, when it passes the third point of divergence 331, remains on the main branch owing to the closure of the third expansion member 333.

In the heat transfer fluid loop 2, the control member 23 impedes the circulation of the heat transfer fluid in the second line 210 such that the heat transfer fluid circulates in the main line 200 along a path identical to that described above with reference to FIG. 2.

Note that the present embodiment may also implement the second mode of operation ensuring simultaneous temperature management of the vehicle interior and the electrical storage device 11, the description provided above with reference to FIG. 3 being transposable to the present alternative.

FIG. 6 shows a third mode of operation of the temperature management system 1 according to the third embodiment as shown in FIG. 4, in which the refrigerant circuit 3 is operating in vehicle interior heating mode.

In this third example of operation, the second branch 310 of the refrigerant circuit 3, thermally coupled to the electrical storage device 11, is not traversed by the refrigerant.

The refrigerant leaves the compression device 31 in the gaseous state, at high pressure and at high temperature, and heads for the second point of divergence 321. The regulating member 39 of the main branch 300 is closed while the regulating member 324, included in the third branch 320, is open. The compressed refrigerant is thus diverted from the main branch 300 and sent to the third branch 320 so as to bypass the first heat exchanger 33.

The refrigerant is then sent back to the main branch 300 at the second point of convergence 322 before passing through the first part 371 of the internal heat exchanger 37, the operation of which is identical to that described above. The refrigerant leaves the internal heat exchanger 37 in an at least partially liquid state and circulates on the main branch 300 as far as the third point of divergence 331 at which, owing to the opening of the third expansion member 333, it is sent to the fourth branch 330.

Advantageously, the main branch 300 may also comprise at least one non-return valve 391, arranged between the outlet of the third heat exchanger 35 and the third point of divergence 331 and configured to impede the circulation of the refrigerant in the main branch 300 when it is sent to the fourth branch 330.

The refrigerant passes through the third expansion member 333, in which it undergoes expansion, and emerges in the biphasic state. This expanded refrigerant then passes through the third point of convergence 332 before entering the first heat exchanger 33 which is used as an evaporator and configured to exchange heat between the refrigerant and the air flow FA1 external to the vehicle interior.

By way of example, the refrigerant entering the first heat exchanger 33 may have a temperature of the order of −30° C. while the external air flow FA1 has a higher temperature, for example of the order of −20 to −5° C. Moreover, as the primary radiator 22 is stopped when the refrigerant circuit 3 is operating in heating mode, the external air flow FA1 involved in the heat exchange in the first heat exchanger 33 is not previously heated by passing through the primary radiator 22. The external air flow FA1 thus gives up its heat energy to the refrigerant, which is colder, circulating in the first heat exchanger 33 so as to evaporate same.

Note also that, when the external air flow FA is at such temperatures, it may directly cool the electrical storage device 11 and/or the at least one element 12 of the electric powertrain.

The refrigerant leaves the first heat exchanger 33 in the at least partially gaseous state and is sent to the second heat exchanger where it undergoes a second evaporation. To be specific, according to the third mode of operation, the second heat exchanger may be configured to operate as a second evaporator. Thus, the heat transfer fluid circulating in the second pass 342 of the second heat exchanger 22 gives up heat energy to the refrigerant circulating in the first pass 341 of the second heat exchanger. The refrigerant thus emerges heated and in an essentially gaseous state, then circulates to the fourth point of divergence 361 of the refrigerant circuit 3. Since the device 363 for regulating the flow of refrigerant of the fifth branch 360 is open, the refrigerant bypasses the third heat exchanger 35 and is sent to the fifth branch 360, in the direction of the fourth point of convergence 362 and the second part 372 of the internal heat exchanger 37.

In the heat transfer fluid loop, the primary radiator 22 is inactive. The heat transfer fluid is circulated in the loop 2 as far as the control member 23 arranged at the branch point 201. This is selectively open so as to impede the circulation of the heat transfer fluid toward the primary radiator 22 and allow it to circulate in the second line 210. At the connection point 202, the heat transfer fluid is returned to the main line 200 in the direction of the second heat exchanger 34 which is, as explained above, used as an evaporator with respect to the refrigerant circulating in the circuit 3. The heat transfer fluid circulating in the second pass 342 of the second heat exchanger 34, being colder than the refrigerant, gives up heat energy to the latter. The heat transfer fluid thus cooled is sent back to the circulation element 21, then to the at least one element 12 of the powertrain, which it may thus advantageously cool.

Advantageously, the first and second embodiments as set out with reference to FIGS. 1 to 4 may also comprise the third branch and/or the fourth branch and/or the fifth branch as described with reference to FIGS. 4 to 6, the features and elements relating to these branches being, according to alternative embodiments, transposable to the first and second embodiments.

FIGS. 7 to 11 show two embodiments of the temperature management system 1 in which the third heat exchanger 35 exchanges heat between the refrigerant circulating in the circuit 3 and the heat transfer fluid circulating in the loop 2. Unlike the third heat exchanger 35 as previously explained, i.e. exchanging heat between the external air flow FA1 and the refrigerant, the position of the third heat exchanger 35 according to the present embodiments does not have to be in an area of circulation of an external air flow FA1, for example at the front end. Moreover, such a third heat exchanger 35 may advantageously be arranged at a distance from the first heat exchanger 33, thus facilitating its installation within the vehicle and limiting the bulk created by the temperature management system 1 at the front end of the vehicle. Furthermore, such a third heat exchanger 35 may have smaller dimensions than the third heat exchanger 35 as described with reference to the first three embodiments while still having similar cooling capacities.

FIG. 7 shows a fourth embodiment of the present invention, the refrigerant circuit 3 of which is substantially identical to what has been explained above for the third embodiment. The description relating to said circuit, provided with reference to FIGS. 4 to 6, may thus be transposed to the present embodiment.

As explained above, the refrigerant circuit 3 may comprise, between the outlet of the fourth heat exchanger 36 and the inlet of the second part 372 of the internal heat exchanger 37, the accumulation device 6.

The heat transfer fluid loop 2, similar to what has been explained for the third embodiment with reference to FIGS. 4 to 6, comprises the main line 200 on which the heat transfer fluid circulation element 21, the primary radiator 22 and the second heat exchanger 34 are arranged. The heat transfer fluid loop 2 comprises the second line 210 which branches off from the main line 200 between the branch point 201 as previously described and the connection point 202. This second line 210 may include at least the heat transfer fluid flow control member 23.

Furthermore, according to the present embodiment, the heat transfer fluid loop 2 comprises a branch line 220 which includes at least the third heat exchanger 35 and a secondary radiator 24 configured to exchange heat between the heat transfer fluid and the air flow FA1 external to the vehicle interior. The secondary radiator 24 is in particular arranged upstream of the primary radiator 22 according to the direction of circulation S3 of the air flow FA1 external to the vehicle interior such that, at the front end of the vehicle, there are in succession, according to the direction of circulation S3 of the external air flow, the secondary radiator 24 then the primary radiator 22 then the first heat exchanger 33.

The branch line 220 extends between a separation point 221, arranged between an outlet of the heat transfer fluid circulation element 21 and the inlet of the primary radiator 22, and a joining point 222, arranged between the outlet of the second heat exchanger 3 and an inlet of the circulation element 21. The branch line 220 advantageously allows the simultaneous circulation, in parallel, of the heat transfer fluid in the primary radiator 22 then the second heat exchanger 34, on the one hand, and in the secondary radiator 24 and the third heat exchanger 35, on the other hand.

FIG. 8 shows the temperature management system 1 according to the fourth embodiment when it is operating according to the first mode of operation, i.e. when the refrigerant circuit 3 is configured to operate in air-conditioning mode.

In the refrigerant circuit 3, the circulation of the refrigerant is confined to the main branch 300 of the circuit 3, the path of the refrigerant thus being substantially identical to what was explained above in relation to the first embodiments. The description provided with reference to FIG. 2 or with reference to FIG. 5 may thus be transposed to the present embodiment except that, in the present embodiment, the temperature management system may not have a bottle or, alternatively, the bottle 4 may be arranged between the outlet of the second heat exchanger 34 and the inlet of the third heat exchanger 35, for example downstream of the fourth point of divergence 361 according to the direction of circulation of the refrigerant in the circuit 3. With such an architecture, only the third heat exchanger 35 operates as a supercooler instead of at least the second heat exchanger 34 and the third heat exchanger 35, as described above.

Note that this embodiment may also implement the second mode of operation, as described above with reference to FIG. 3, in order to simultaneously ensure temperature management of the vehicle interior and temperature management of the electrical storage device 11, the description of the path of the refrigerant in the second branch 310 provided with reference to FIG. 3 being transposable to this embodiment.

In the heat transfer fluid loop 2, the heat transfer fluid is circulated in the main line 200 as far as the control member 23 arranged at the branch point 201. This is selectively open so as to impede the circulation of the heat transfer fluid toward the second line 210 and send the heat transfer fluid to the primary radiator 22. At the separation point 221, the heat transfer fluid is divided into two portions. A first fraction 301 of the heat transfer fluid is sent on the branch line 220, to the secondary radiator 24, while a second fraction remains on the main line 200 and circulates in the direction of the primary radiator 22.

On the main line 200, the heat transfer fluid enters the primary radiator 22 and discharges heat energy into the external air flow. Advantageously, the primary radiator 22 is arranged in the loop 2 so as to discharge into the external air flow FA1 heat energy captured in the at least one element 12 of the powertrain. The heat transfer fluid then circulates in the second pass 342 of the second heat exchanger 34 in which it captures heat energy from the refrigerant, which is warmer, circulating in the first pass 341 of the second heat exchanger 34. The heat transfer fluid is then returned to the circulation element 21.

In the branch line 220, the heat transfer fluid circulating in the secondary radiator 24, being warmer than the external air flow FA, gives up heat energy to the latter. The secondary radiator 24 is arranged in the loop so as to discharge into the external air flow FA1 heat energy captured in the at least one element 12 of the powertrain. The secondary radiator 24 is advantageously arranged so as to allow heat exchange between the heat transfer fluid and the entire external air flow FA1, and it therefore offers good heat exchange efficiency, and the temperature of the heat transfer fluid may be lowered to a temperature close to the temperature of the external air flow FA1. The heat transfer fluid thus cooled is sent to the third heat exchanger 35, used as a supercooler, while the heated external air flow FA1 circulates through the primary radiator 22, as explained above. The heat transfer fluid circulating in a second pass 352 of the third heat exchanger 35 captures the heat energy from the refrigerant circulating in a first pass 351 of the third heat exchanger 35, which is warmer and comes from the second heat exchanger 34, and lowers the temperature of the refrigerant to a temperature close to that of the external air flow FA1 arriving at the front end of the vehicle.

The heat transfer fluid coming from the secondary radiator 24 is thus advantageously lowered to a temperature close to that of the external air flow. Such an architecture of the temperature management system 1 thus advantageously reduces the temperature pinch of the third exchanger 35 so as to improve the thermal capacity of said system.

FIG. 9 shows the temperature management system 1 according to the fourth embodiment when it is implementing the third mode of operation, i.e. when the refrigerant circuit 3 is configured to operate in heating mode. The path of the refrigerant in the circuit is similar to what was described above in relation to the third embodiment, the description provided with reference to FIG. 6 thus being transposable to the present embodiment.

In the heat transfer fluid loop 2, like what was described with reference to FIG. 6, the control member 23 impedes the circulation of the heat transfer fluid to the primary radiator 22. In the present embodiment, the result is that circulation to the secondary radiator 24 is also prevented, the primary radiator 22 and the secondary radiator 24 thus being inactive.

Thus, at the branch point 201, the heat transfer fluid is sent to the second line 210 before being returned to the main line 200 upstream of the second heat exchanger 34 according to the direction of circulation S1 of the heat transfer fluid in the loop. As set out above, the heat transfer fluid, which is warmer than the refrigerant circulating in the first pass 341 of the second heat exchanger 34, gives up heat energy to the latter so as to evaporate same. The heat transfer fluid thus leaves the second heat exchanger 34 cooled before being sent back to the circulation element 21 and to the at least one element 12 of the powertrain so as to cool same.

FIG. 10 shows a fifth embodiment of the present invention in which the third heat exchanger 35 exchanges heat between the refrigerant circulating in the circuit and the heat transfer fluid circulating in the loop. In the present embodiment, the refrigerant circuit 3 is substantially identical to what has been explained above with reference to the third and fourth embodiments. The description relating to said circuit, provided with reference to FIGS. 4 and 7, may thus be transposed to the present embodiment. The present embodiment makes it possible to further reduce the temperature pinch between the heat transfer fluid at the outlet of the secondary radiator 24 and the external air flow FA1 and therefore to improve the thermal performance of the temperature management system 1.

Like the fourth embodiment, the temperature management system may have no bottle, as currently shown, or may include the bottle 4, arranged between the outlet of the second heat exchanger 34 and the inlet of the third heat exchanger 35. The same goes for the accumulator as mentioned above, arranged upstream of the second part 372 of the internal heat exchanger 37 according to the direction of circulation S2 of the refrigerant in the circuit 3.

Moreover, the fifth embodiment differs from the third embodiment by the absence of the second line 210 and by a different arrangement of the branch line 220 in the heat transfer fluid loop 2. According to this fifth embodiment, the branch line 220 may extend between the separation point 221, this time arranged between the outlet of the primary radiator and the inlet of the second heat exchanger, and the joining point 222 arranged, as described above, between the outlet of the second heat exchanger 34 and the inlet of the circulation element 21. Like the fourth embodiment, the branch line 220 comprises at least the third heat exchanger 35 and the secondary radiator 24 configured to exchange heat between the heat transfer fluid and the external air flow, the secondary radiator 24 being arranged upstream of the primary radiator 22 according to the direction of circulation S3 of the air flow external to the vehicle interior. As described above with reference to the fourth embodiment, the secondary radiator 24 is advantageously arranged so as to allow heat exchange between the heat transfer fluid and the entire external air flow FA1, and it therefore offers good heat exchange efficiency and allows the temperature of the heat transfer fluid to be lowered to a temperature close to the temperature of the external air flow FA1.

FIG. 11 shows the temperature management system 1 according to the fifth embodiment when it is implementing the first mode of operation, i.e. when the refrigerant circuit 3 is configured to operate in air-conditioning mode.

In the refrigerant circuit 3, the circulation of the refrigerant is confined to the main branch 300, the path of the refrigerant being substantially identical to what was explained above in relation to the third or fourth embodiments and therefore the description provided with reference to FIGS. 5 and 8 is transposable to this mode, except for the presence or the position of the bottle.

Note that this embodiment may also implement the second mode of operation as described above, in order to simultaneously ensure temperature management of the vehicle interior and temperature management of the electrical storage device 11, the description of the path of the refrigerant provided with reference to FIG. 3 thus also being applicable to this embodiment.

In the heat transfer fluid loop 2, the heat transfer fluid is circulated in the main line 200 as far as the primary radiator 22, where it discharges heat energy into the external air flow, which is colder. The heat transfer fluid thus cooled leaves the primary radiator 22 and circulates in the main line 200 as far as the separation point 221. There, a first fraction of the heat transfer fluid is sent to the second heat exchanger 34 while a second fraction of the heat transfer fluid is sent in the branch line 220 to the secondary radiator 24, to be cooled a second time.

As explained above with reference to FIG. 8, in the second heat exchanger 34, the heat transfer fluid captures heat energy from the refrigerant, which is warmer, circulating in the first pass 341 of the second heat exchanger 34. This heat transfer fluid is then returned to the circulation element 21, for example so as to cool the at least one element 12 of the powertrain.

In the branch line 220, the second fraction of heat transfer fluid previously cooled in the primary radiator 22 enters the secondary radiator 24. The heat transfer fluid gives up heat energy to the external air flow, which is colder, and leaves the secondary radiator 24 at a temperature lower than that observed at the outlet of the primary radiator 22 and close to the temperature of the external air flow FA1. This heat transfer fluid is then sent to the second pass 352 of the third heat exchanger 35, which is used as a supercooler, in which it captures the heat energy from the refrigerant, which is warmer, coming from the second heat exchanger 34. The temperature of the refrigerant circulating in the first pass 351 of the third heat exchanger 35 is thus lowered to a temperature close to the temperature of the external air flow FA1. The heat transfer fluid then circulates in the main line 200 so as to allow, in particular, the cooling of the at least one element 12 of the electric powertrain.

Such an architecture of the temperature management system 1 ensures that the second fraction of heat transfer fluid is cooled twice in succession so as to further lower the temperature thereof, thus optimizing the supercooling of the refrigerant in the third heat exchanger 35. To be specific, at the inlet of the secondary radiator 24, the second fraction of heat transfer fluid has a temperature lower than that which could be observed, at this same point, in the fourth embodiment as described above with reference to FIG. 7. The temperature pinch between the heat transfer fluid and the external air flow FA1 in the secondary radiator 24 is thus reduced compared to the fourth embodiment. The path of the second fraction of heat transfer fluid is thus comparable to the circulation of a fluid in a heat exchanger comprising two layers arranged counter-currently, which is thermally more efficient.

The present invention thus proposes a temperature management system for a vehicle comprising at least a refrigerant circuit in which a first heat exchanger, a second heat exchanger and a third heat exchanger are arranged between a compression device and an expansion member of said circuit, at least the second heat exchanger and/or the third heat exchanger being configured to operate as a supercooler so as to be able to ensure supercooling of the refrigerant with a view to improving the coefficient of performance of the system as a whole. The temperature management system also comprises at least a heat transfer fluid loop comprising at least a primary radiator arranged at the front end of the vehicle, upstream of the first heat exchanger of the circuit according to the direction of circulation of an air flow external to the vehicle interior.

The present invention is not limited to the means and configurations described and illustrated herein, however, and also extends to all equivalent means or configurations and to any technically operational combination of such means. In particular, the architecture of the heat transfer fluid circulation loop and the architecture of the refrigerant circuit may be modified without detriment to the invention, as long as they provide the functionalities of the temperature management system that are described and illustrated in the present document.

The invention claimed is:

1. A temperature management system for a vehicle comprising:
    at least a refrigerant circuit; and
    at least a heat transfer fluid loop,
    the refrigerant circuit comprising:
        a compression device comprising a pressure raising flow path for a refrigerant from an inlet of the compression device to an outlet of the compression device,
        an expansion member comprising a pressure reducing flow path for the refrigerant from an inlet of the expansion member to an outlet of the expansion member,
        a first heat exchanger configured to exchange heat between the refrigerant and an air flow external to a vehicle interior,
        a second heat exchanger configured to exchange heat between the refrigerant and the heat transfer fluid circulating in the loop, and
        a fourth heat exchanger configured to exchange heat between the refrigerant and an air flow inside the vehicle interior, and
    the heat transfer fluid loop comprising, on a main line, the second heat exchanger and at least a primary radiator configured to exchange heat between the air flow external to the vehicle interior and the heat transfer fluid,
    wherein the refrigerant circuit comprises a third heat exchanger configured to exchange heat between the refrigerant and the external air flow or between the refrigerant and the heat transfer fluid and in that the first heat exchanger, the second heat exchanger and the third heat exchanger are arranged in a high pressure portion of the refrigerant circuit between the outlet of the compression device and the inlet of the expansion member.

2. The temperature management system as claimed in claim 1, wherein the second heat exchanger and the primary radiator are arranged in the main line of the heat transfer fluid loop so that the primary radiator discharges heat energy captured by the second heat exchanger into the external air flow.

3. The temperature management system as claimed in claim 1, wherein the primary radiator is arranged upstream of the first heat exchanger according to a direction of circulation of the external air flow.

4. The management system as claimed in claim 1, wherein the heat transfer fluid loop is thermally coupled to at least one element of an electric powertrain of the vehicle.

5. The temperature management system as claimed in claim 1, wherein the refrigerant circuit is a closed circuit comprising at least a main branch on which are successively arranged at least the compression device, the first heat exchanger, the second heat exchanger, the third heat exchanger, the expansion member, referred to as the first expansion member, and the fourth heat exchanger, the refrigerant circuit comprising a second branch which extends from a point of divergence, arranged between an outlet of the third heat exchanger and an inlet of the fourth heat exchanger, to a point of convergence, arranged between an outlet of the fourth heat exchanger and an inlet of the compression device, the second branch comprising at least an expansion member, referred to as the second expansion member, and a fifth heat exchanger thermally coupled to an electrical storage device of the vehicle.

6. The temperature management system as claimed in claim 5, wherein the refrigerant circuit comprises a third branch which extends between a point of divergence, referred to as the second point of divergence, arranged between the outlet of the compression device and an inlet of the first heat exchanger, and a point of convergence, referred to as the second point of convergence, arranged between the outlet of the third heat exchanger and the inlet of the fourth heat exchanger, the third branch comprising at least one heat exchanger used as a condenser, the refrigerant circuit comprising a fourth branch which extends between a point of divergence, referred to as the third point of divergence, arranged between the outlet of the third heat exchanger and the inlet of the fourth heat exchanger, and a point of convergence, referred to as the third point of convergence, arranged between the outlet of the compression device and the inlet of the first heat exchanger, the fourth branch comprising at least an expansion member referred to as the third expansion member.

7. The temperature management system as claimed in claim 1, wherein the refrigerant circuit comprises a fifth branch which extends between a point of divergence, referred to as the fourth point of divergence, arranged between an outlet of the second heat exchanger and an inlet of the third heat exchanger, and a point of convergence, referred to as the fourth point of convergence, arranged between the outlet of the fourth heat exchanger and the inlet of the compression device.

8. The temperature management system as claimed in claim 1, wherein the third heat exchanger is configured to exchange heat between the refrigerant and the air flow external to the vehicle interior, and wherein the third heat exchanger is arranged upstream of the first heat exchanger according to the direction of circulation of the air flow external to the vehicle interior.

9. The temperature management system as claimed in claim 8, wherein the heat transfer fluid loop comprises a second line which branches off from the main line between a branch point, arranged between an outlet of the circulation element and an inlet of the primary radiator, and a connection point, arranged between an outlet of the primary radiator and the inlet of the second heat exchanger, the second line comprising at least one heat transfer fluid flow control member.

10. The temperature management system as claimed in claim 1, wherein the third heat exchanger is configured to exchange heat between the refrigerant and the heat transfer fluid.

11. The temperature management system as claimed in claim 10, wherein the heat transfer fluid loop comprises a branch line comprising at least the third heat exchanger and a secondary radiator configured to exchange heat between the heat transfer fluid and the external air flow, the secondary radiator being arranged upstream of the primary radiator according to the direction of circulation of the air flow external to the vehicle interior.

12. The temperature management system as claimed in claim 11, wherein the branch line extends between a separation point, arranged between the outlet of the heat transfer fluid circulation element and the inlet of the primary radiator, and a joining point, arranged between an outlet of the second heat exchanger and an inlet of the circulation element.

13. The temperature management system as claimed in claim 11, wherein the heat transfer fluid loop comprises a second line which branches off from the main line between a branch point, arranged between an outlet of the circulation element and an inlet of the primary radiator, and a connection point, arranged between an outlet of the primary radiator and the inlet of the second heat exchanger, the second line comprising at least one heat transfer fluid flow control member.

14. The temperature management system as claimed in claim 11, wherein the branch line extends between a separation point, arranged between the outlet of the primary radiator and the inlet of the second heat exchanger, and a joining point, arranged between the outlet of the second heat exchanger and the inlet of the circulation element.

* * * * *